United States Patent
Velarde et al.

(10) Patent No.: US 8,635,599 B2
(45) Date of Patent: Jan. 21, 2014

(54) SYSTEM AND METHOD FOR EVALUATING ADHERENCE TO A STANDARDIZED PROCESS

(75) Inventors: Samantha Pineda Velarde, Jalisco (MX); Dejanira Alatriste Gutiérrez, Candelaria Coyoacan (MX); Leticia Cruz Ruiz, Mexico City (MX); Salvador Hernández Mancilla, Cuautitlán Izcalli (MX); Jesus E. Pelayo Peña, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 1895 days.

(21) Appl. No.: 11/465,563

(22) Filed: Aug. 18, 2006

(65) Prior Publication Data
US 2008/0046859 A1 Feb. 21, 2008

(51) Int. Cl.
*G06F 9/44* (2006.01)
*H04L 29/06* (2006.01)

(52) U.S. Cl.
USPC ........... 717/124; 717/120; 717/121; 717/122; 717/123; 713/158

(58) Field of Classification Search
None
See application file for complete search history.

(56) References Cited

U.S. PATENT DOCUMENTS

| | | | |
|---|---|---|---|
| 5,493,682 A * | 2/1996 | Tyra et al. ..................... | 717/122 |
| 5,627,973 A * | 5/1997 | Armstrong et al. .......... | 705/7.32 |
| 5,765,138 A | 6/1998 | Aycock et al. | |
| 6,151,581 A | 11/2000 | Kraftson et al. | |
| 7,210,123 B2 * | 4/2007 | Makiyama .................... | 717/120 |
| 7,228,524 B2 * | 6/2007 | Bailey et al. .................. | 717/100 |
| 7,735,064 B2 * | 6/2010 | Hunt et al. .................... | 717/124 |
| 7,742,939 B1 * | 6/2010 | Pham .............................. | 705/7 |
| 7,774,743 B1 * | 8/2010 | Sanchez et al. ............... | 717/103 |
| 7,788,632 B2 * | 8/2010 | Kuester et al. ................ | 717/100 |
| 7,805,706 B1 * | 9/2010 | Ly et al. ........................ | 717/121 |

(Continued)

FOREIGN PATENT DOCUMENTS

WO WO 2007068509 A2 * 6/2007

OTHER PUBLICATIONS

Adam A. Porter et al. "Comparing Detection Methods for Software Requirements Inspections: A Replicated Experiment", [Online], IEEE 1995, pp. 563-575, [Retrieved from Internet on Sep. 5, 2013], <http://ieeexplore.ieee.org/stamp/stamp.jsp?tp=&arnumber=391380>.*

(Continued)

*Primary Examiner* — Thuy Dao
*Assistant Examiner* — Ziaul A Chowdhury
(74) *Attorney, Agent, or Firm* — Douglas Lashmit; Hoffman Warnick LLC

(57) ABSTRACT

A checklist process system and method for measuring adherence to a process defined in accordance with a standardized model, such as CMMI®—Capability Maturity Model Integration. A system is provided that includes: a database of checklists, wherein each checklist includes a set of requirements defined in accordance with the process; a weight assignment system for assigning a weight to each requirement in each checklist; an evaluation system for evaluating a checklist, wherein the evaluation system awards the weight associated with each requirement if the requirement has been met; and an adherence value generation system that calculates an adherence value for the checklist based on all the weights awarded in the checklist.

10 Claims, 2 Drawing Sheets

(56) References Cited

U.S. PATENT DOCUMENTS

| | | | |
|---|---|---|---|
| 8,266,426 B2* | 9/2012 | Li | 713/158 |
| 8,291,384 B2* | 10/2012 | Takahashi | 717/124 |
| 8,336,028 B2* | 12/2012 | Hinton et al. | 717/123 |
| 8,418,123 B2* | 4/2013 | Kamiyama et al. | 717/101 |
| 2002/0040312 A1* | 4/2002 | Dhar et al. | 705/8 |
| 2002/0042731 A1 | 4/2002 | King, Jr. et al. | |
| 2002/0137015 A1* | 9/2002 | Guinta et al. | 434/323 |
| 2003/0171976 A1 | 9/2003 | Farnes et al. | |
| 2004/0044546 A1* | 3/2004 | Moore | 705/2 |
| 2004/0093584 A1* | 5/2004 | Le | 717/103 |
| 2004/0186927 A1* | 9/2004 | Eryurek et al. | 710/12 |
| 2004/0230551 A1* | 11/2004 | Bisceglia | 707/1 |
| 2005/0043977 A1* | 2/2005 | Ahern et al. | 705/7 |
| 2005/0144151 A1* | 6/2005 | Fischman et al. | 706/45 |
| 2005/0182667 A1* | 8/2005 | Metzger et al. | 705/4 |
| 2005/0197870 A1 | 9/2005 | Canada et al. | |
| 2007/0277155 A1* | 11/2007 | Casey | 717/124 |
| 2008/0040125 A1* | 2/2008 | Okabe et al. | 705/1 |
| 2010/0100871 A1* | 4/2010 | Celeskey et al. | 717/124 |
| 2011/0231817 A1* | 9/2011 | Hadar et al. | 717/120 |

OTHER PUBLICATIONS

Robyn R. Lutz, "Targeting Safety-Related Errors During Software Requirements Analysis"[Online], ACM 1993, pp. 223-230, [Retrieved from Internet on Sep. 5, 2013], <http://pdf.aminer.org/000/601/231/targeting_safety_related_errors_during_software_requirements_analysis.pdf>.*

Mark Dowson, "Software Process Themes and Issues", [Online], IEEE 1993, pp. 54-62, [Retrieved from INternet on Sep. 5, 2013], <http://ieeexplore.ieee.org/stamp/stamp.jsp?tp=&arnumber=236822>.*

Sylvie Trudel et al., "PEM: The small company-dedicated software process quality evaluation method combining CMMISM and ISO/IEC 14598" [Online], Springer 2006, pp. 7-23,[Retrieved from Internet on Sep. 5, 2013], <http://link.springer.com/content/pdf/10.1007%2Fs11219-006-5997-8.pdf>.*

* cited by examiner

| Process | Question | Evidence? | Weight | Points | Comments (To be filled by the SQA Reviewer) | Action Plan (To be filled by the PM) | Due Date (To be filled by the PM) | Results (Filled by the SQA Reviewer) |
|---|---|---|---|---|---|---|---|---|
| | Remarks: | | | | | | | |
| Defect Prevention | 1. Have project team members been trained to perform their defect prevention activities? | No | 2 | 2 | | | | |
| | 2. Are Defect Prevention activities planned according to a documented process? | Yes | 2 | 2 | | | | |
| | 3. Are Defect Prevention activities performed according to the plan? | Yes | 3 | 0 | Aún no se realiza por la fase en la que se encuentra el proyecto | | | |
| | 4. Are action proposals and items resulting of defect prevention process followed? | Yes | 2 | 2 | Aún no se realiza por la fase en la que se encuentra el proyecto | | | |
| | 5. Are Defect Prevention measurements documented according to the AMS México Software Development Metrics Document? | Yes | 1 | 1 | | | | |
| | Remarks: | | | | | | | |
| | Total | | 10 | 7 | 70% A=91%-100% B=81%-90% C=61%-80% D=<60% | | | |

FIG. 2

SYSTEM AND METHOD FOR EVALUATING ADHERENCE TO A STANDARDIZED PROCESS

FIELD OF THE INVENTION

The invention relates generally to verifying a project's and/or organizational groups' adherence to standardized processes, and more specifically relates to a system and method of evaluating adherence to a standardized process by assigning weights to tasks defined within the process.

BACKGROUND OF THE INVENTION

Checklists are an integral part of ensuring adherence to standardized processes, such as OSSP (Organizational Standard Software Process) provided according to the Capability Maturity Model Integrations®—CMMI (i.e., the "model"). OSSP is the operational definition that guides the establishment of a common software process across all software projects in an organization. OSSP describes the fundamental software process elements that each software project is expected to incorporate into its defined software process. OSSP also describes the relationships (e.g., ordering and interfaces) between these software process elements.

Also, according to the model, the "project's defined software process" is well characterized and understood, and is described in terms of software standards, procedures, tools, and methods. It is developed by tailoring the organization's standard software process to fit the specific characteristics of the project.

As noted, adherence to project's defined software process is typically tracked with the use of checklists. A problem with implementing checklists currently in place is that their implementation is subjective. In other words, decisions regarding whether tasks or processes adequately adhere to the standardized process can vary based on the reviewer. Moreover, they fail to provide an effective mechanism for determining an objective measure of the adherence. Accordingly, a need exists for an improved checklist system and method for determining adherence to project's defined software process.

SUMMARY OF THE INVENTION

The present invention addresses the above-mentioned problems, as well as others, by providing a system and method for measuring adherence to a defined process, such as OSSP (Organizational Standard Software Process) provided in accordance with CMMI® (Capability Maturity Model Integration®). The invention includes the requirements to be reviewed by process area according to a model (e.g., CMMI®), as well as the requirements demanded by the organization according to its improvement needs.

In a first aspect, the invention provides a checklist processing system for measuring adherence to a process defined in accordance with a standardized model, comprising: a database of checklists, wherein each checklist includes a set of requirements defined in accordance with the process; a weight assignment system for assigning a weight to each requirement in each checklist; an evaluation system for evaluating a checklist, wherein the evaluation system awards the weight associated with each requirement if the requirement has been met; and an adherence value generation system that calculates an adherence value for the checklist based on all the weights awarded in the checklist.

In a second aspect, the invention provides a method of measuring adherence to a process defined in accordance with a standardized model, comprising: providing a database of checklists, wherein each checklist includes a set of requirements defined in accordance with the process; assigning a weight to each requirement in a checklist; evaluating requirements in the checklist by awarding the weight associated with a selected requirement if the selected requirement has been met; and calculating an adherence value for the checklist based on all the weights awarded in the checklist.

In a third aspect, the invention provides computer program product stored on a computer usable medium for measuring adherence to a process, comprising: program code configured for assigning a weight to each requirement in a checklist; program code configured for evaluating requirements in the checklist by awarding the weight associated with a requirement if the requirement has been met; and program code configured for calculating an adherence value for the checklist based on all the weights awarded in the checklist.

In a fourth aspect, the invention provides a method for deploying checklist processing system, comprising: providing a computer infrastructure being operable to: access a database of checklists, wherein each checklist includes a set of requirements defined in accordance with the process; assign a weight to each requirement in a checklist; evaluate requirements in the checklist by awarding the weight associated with a selected requirement if the selected requirement has been met; and calculate an adherence value for the checklist based on all the weights awarded in the checklist.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative checklist in accordance with an embodiment of the present invention.

DETAILED DESCRIPTION OF THE INVENTION

Figure 1:
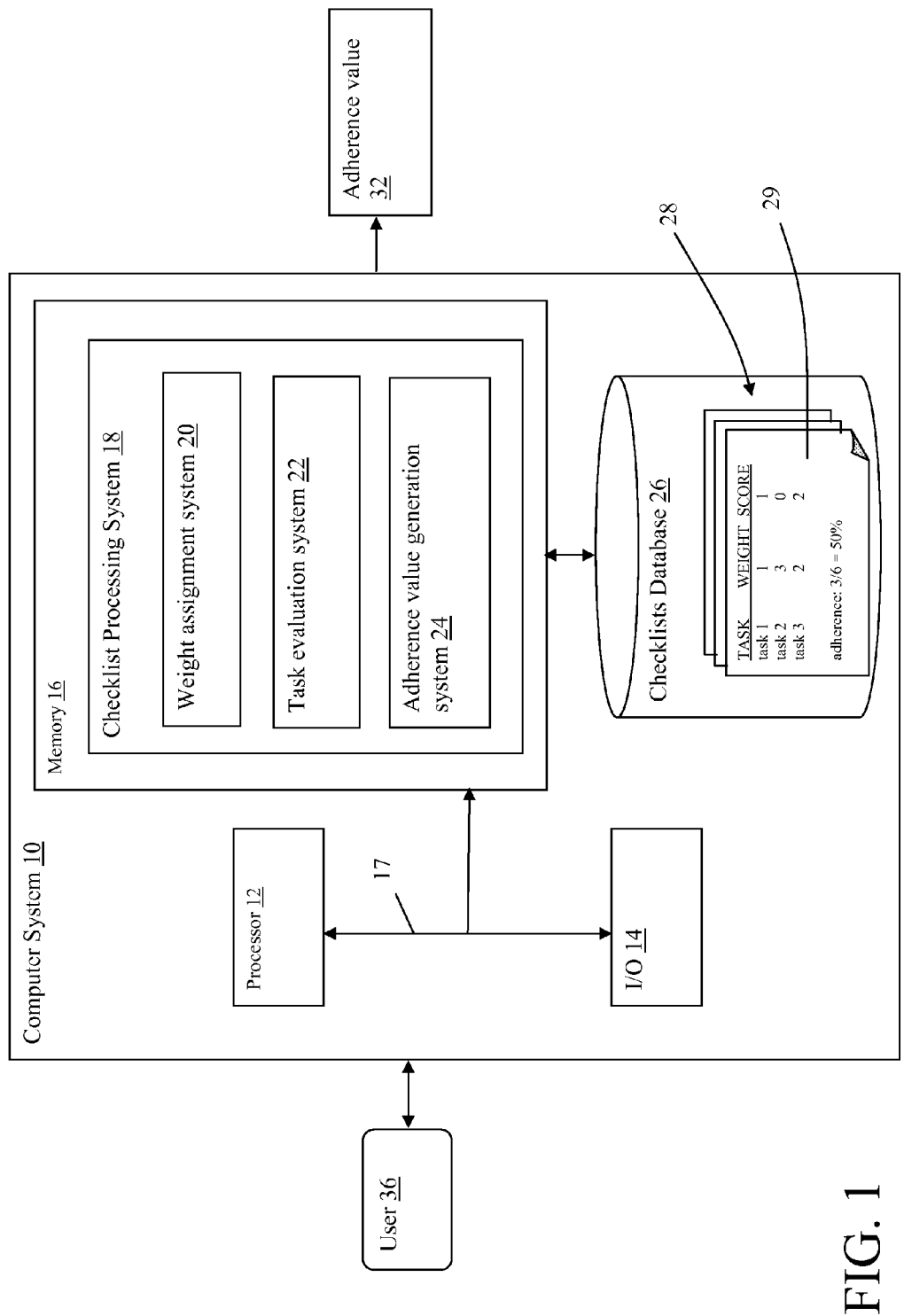
FIG. 1 depicts a computer system having a checklist processing system in accordance with an embodiment of the present invention.

Referring now to drawings, FIG. 1 depicts a computer system 10 having a checklist processing system 18 for objectively measuring adherence to a standardized process, such as OSSP (Organizational Standard Software Process) according to CMMI®. Also provided within computer system 10 is a checklists database 26, which includes a set of task performance checklists 28 that help to define the requirements of the standardized process. For example, each task performance checklist 29 may include a set of requirements (i.e., items) that must be met to ensure adherence for a particular task associated with a project, e.g., a software implementation project.

Generally, in order for a project or organizational group to be successfully implemented in accordance with the defined process, all of the requirements in the corresponding checklists 28 must be adhered to. Items with checklists 28 generally fall into two categories. The first category includes checklists specified by a standardized model such as CMMI®, which may provide, e.g., a Software Engineering Institute (SEI) checklist (for projects), a Software Engineering Process Group (SEPG) checklist and Process Implementation Team Checklist (for the SEPG), a Defect Prevention checklist (for a Defect Prevention Team), a Technology Change Management checklist (for a Technology Management Team), a Training Program Checklist (for a Training Team), an Software Quality Assurance (SQA) Checklist (for a Process and Product Quality Assurance "PPQA" Group), etc., which include all the requirements to be verified by the PPQA Group. Note that each team or group checklist addresses a particular group adherence, while the SEI Checklist addresses project adherence.

A second category of items in checklists 28 define organizational specific requirements or factors that the organization itself is demanding according to organizational needs. Checklists 28 may contain both categories, items to be reviewed according to the CMMI and items to be reviewed according to the organizational needs.

In order to provide a more robust assessment of adherence to a defined process, the present invention assigns weights to each of the requirements within each checklist 28. To implement this, checklist processing system 18 includes a weight assignment system 20, which provides a mechanism, e.g., a graphical user interface, an expert system, a spreadsheet, etc., to allow a user 36 or some other process to assign weights to requirements within each checklist. In a typical embodiment, the assignment of weights (or weighted points) is performed ahead of time, i.e., after completion of the OSSP definition. The assignment of weights may also be validated on a periodic basis in order to identify changing organizational needs. In one illustrative embodiment, each requirement is given a weight of 1, 2 or 3, where 1 indicates a low priority, 2 indicates a medium priority and 3 indicates a high priority. For instance, checklist 29 shown in checklists database 26 depicts requirement 1 having a weight of 1, requirement 2 having a weight of 3, and requirement 3 having a weight of 2.

Also included in checklist processing system 18 is a task evaluation system 22, which provides a mechanism through which an evaluator can evaluate whether various requirements within each checklist have been met. Task evaluation system 22 may for example include a graphical user interface that displays the requirement and provides a check box or yes/no selection for each requirement. In a simple embodiment, task evaluation system 22 may comprise a spreadsheet type document. Assuming a requirement is adequately met, task evaluation system 22 awards all of the weighted points for that requirement. Conversely, if a requirement is not adequately met, task evaluation system 22 awards zero points for the requirement. For instance, in illustrative checklist 29, it can be seen that requirements 1 and 3 received their weighted points, indicating adequate completion, while requirement 2 received a 0, indicating that requirement 2 was not adequately met. Note that in this embodiment, no partial scoring is allowed, i.e., points are only awarded if the requirement is adequately completed. However, it should be noted that a system that utilized partial scoring could be implemented, and therefore falls within the scope of this invention.

Also included in checklist processing system 18 is an adherence value generation system 24 that generates an adherence value 32 for the applicable checklist 28 in the checklists database 26. In one illustrative embodiment, the adherence value 32 is a percentage or ratio of the awarded points relative to the total available weighted points for all of the requirements in a check list. For instance, in illustrative checklist 29, there are three requirements with a total of six available weighted points (1, 3 and 2). Of the six available weighted points, three points were awarded, resulting in an adherence value of 50%. Of particular interest is the fact that even though two of the three requirements were successfully met, the adherence value is only 50%. By weighting each requirement, a more accurate and objective measure of the overall adherence for the task defined by the checklist is thus provided.

FIG. 2 depicts a further example of a task performance checklist 40 that includes five requirements 42. Note that any number of requirements may be included in a given checklist (e.g., 25-50, or more), and the checklist shown in FIG. 2 is for illustrative purposes only. Each requirement is assigned a weight based on the relative importance of the requirement. If the requirement was met, an evaluator then awards the weight as a point value 46. If the requirement was not met, then zero points are awarded. It can be seen that for this task performance checklist 40, an adherence value of 70% has been calculated based on the ratio of total awarded points to available points 48. In this example, a "grade" is also determined based on the percentage—in this case, 70% translates a grade of "C." Thus, even though four of the five requirements were successfully met, the grade for the check list is only a C since the most important requirement was not successfully met. Without the use of weights, such an objective result could not be readily determined without performing a detailed analysis. Thus, by using the checklist processing system 18 described herein, management can readily identify those phases of a project that do not adhere to the desired standard.

In general, computer system 10 may comprise any type of computer system and could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a checklist processing system 18 could be created, maintained and/or deployed by a service provider that offers the functions described herein for customers. That is, a service provider could offer to provide a checklist-based adherence system as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A processor executed method for deploying checklist processing system, comprising:
providing a computer infrastructure being operable to:
access a database of checklists, wherein each checklist includes a set of requirements defined in accordance with the process, wherein each checklist includes a first category and a second category, wherein the first category is a set of first category requirements specified by a standardized model and the second category is a set of second category requirements defined by a user;
assign weighted points to each first category requirement and each second category requirement in each checklist, at least one of the each first and second category requirement being assigned weighted points in excess of one;
evaluate requirements in the checklist, wherein the evaluation comprises, for each of the first and second category requirements in the checklist, the evaluation system awards all of the weighted points associated with the first or second category requirement if the first or second category requirement has been met, and wherein the evaluation system awards none of the weighted points associated with the first or second category requirement if the first or second category requirement has not been met; and
calculate an adherence value for the checklist based on all the weighted points awarded for all of the set of first and second category requirements in the checklist, wherein the adherence value comprises a percentage of the awarded weighted points relative to a total available weighted points for all of the first and second category requirements in the checklist.

2. A processor executed method of measuring adherence to a process, comprising:
providing a database of checklists, wherein each checklist includes a set of requirements defined in accordance with the process, wherein each checklist includes a first category and a second category, wherein the first category is a set of first category requirements specified by a standardized model and the second category is a set of second category requirements defined by a user;
assigning weighted points to each first category requirement and each second category requirement in each checklist, at least one of the each first and second category requirement being assigned weighted points in excess of one;
evaluating requirements in the checklist, the evaluating comprising for each of the first and second category requirements in the checklist, the evaluation system awards all of the weighted points associated with the first or second category requirement if the first or second category requirement has been met, and wherein the evaluation system awards none of the weighted points associated with the first or second category requirement if the first or second category requirement has not been met; and
calculating an adherence value for the checklist based on all the weighted points awarded for all of the set of first and second category requirements in the checklist, wherein the adherence value comprises a percentage of the awarded weighted points relative to a total available weighted points for all of the first and second category requirements in the checklist.

3. The method of claim 2, wherein the step of assigning weights assigns a weight of 3 for high priority first or second category requirements, a weight of 2 for medium priority first or second category requirements, and a weight of 1 for low priority first or second category requirements.

4. The method of claim 2, wherein the process comprises an OSSP (Organizational Standard Software Process).

5. A computer program product stored on a non-transitory computer usable medium for measuring adherence to a process, comprising:
program code for providing a database of checklists, wherein each checklist includes a set of requirements defined in accordance with the process, wherein each checklist includes a first category and a second category, wherein the first category is a set of first category requirements specified by a standardized model and the second category is a set of second category requirements defined by a user;
program code configured for assigning weighted points to each first category requirement and each second category requirement in each checklist, at least one of the each first and second category requirement being assigned weighted points in excess of one;
program code configured for evaluating requirements in the checklist, the evaluating comprising for each of the first and second category requirements in the checklist, the evaluation system awards all of the weighted points associated with the first or second category requirement if the first or second category requirement has been met, and wherein the evaluation system awards none of the weighted points associated with the first or second category requirement if the first or second category requirement has not been met; and program code configured for calculating an adherence value for the checklist based on all the weighted points awarded for all of the set of first and second category requirements in the checklist, wherein the adherence value comprises a percentage of the awarded weighted points relative to a total available weighted points for all of the first and second category requirements in the checklist.

6. The computer program product of claim 5, wherein the standardized process comprises an OSSP (Organizational Standard Software Process).

7. The computer program product of claim 5, wherein a weight of 3 is assigned for high priority first or second category requirements, a weight of 2 is assigned for medium priority first or second category requirements, and a weight of 1 is assigned for low priority first or second category requirements.

8. A checklist processing system for measuring adherence to a process, comprising:
   a processor;
   at least one computer system, including:
   a database of checklists, wherein each checklist includes a set of requirements defined in accordance with the process, wherein each checklist includes a first category and a second category, wherein the first category is a set of first category requirements specified by a standardized model and the second category is a set of second category requirements defined by a user;
   a weight assignment system for assigning weighted points to each first category requirement and each second category requirement in each checklist, at least one of the each first and second category requirement being assigned weighted points in excess of one;
   an evaluation system for evaluating a checklist, wherein, for each of the first and second category requirements in the checklist, the evaluation system awards all of the weighted points associated with the first or second category requirement if the first or second category requirement has been met, and wherein the evaluation system awards none of the weighted points associated with the first or second category requirement if the first or second category requirement has not been met; and
   an adherence value generation system that calculates an adherence value for the checklist based on all the weighted points awarded for all of the set of first and second category requirements in the checklist, wherein the adherence value comprises a percentage of the awarded weighted points relative to a total available weighted points for all of the first and second category requirements in the checklist.

9. The checklist processing system of claim 8, wherein the weight assignment system assigns a weight of 3 for high priority first or second category requirements, a weight of 2 for medium priority first or second category requirements, and a weight of 1 for low priority first or second category requirements.

10. The checklist processing system of claim 8, wherein the process comprises an OSSP (Organizational Standard Software Process).

* * * * *